United States Patent [19]

Schlapman et al.

[11] Patent Number: 4,662,646
[45] Date of Patent: May 5, 1987

[54] TRAILING MOWER AND DRAWBAR ARTICULATION

[75] Inventors: William J. Schlapman, Winneconne; James L. Wirsbinski, Oshkosh; Dale Manteufel, Hortonville, all of Wis.

[73] Assignee: Ingersoll Equipment Co., Inc., Winneconne, Wis.

[21] Appl. No.: 701,260

[22] Filed: Feb. 13, 1985

[51] Int. Cl.$^4$ .............................................. B62D 53/00
[52] U.S. Cl. .................................... 280/462; 172/99; 172/125; 172/679; 280/474
[58] Field of Search .............. 280/462, 463, 467, 468, 280/472, 422, 456 A; 172/311, 98, 99, 125, 679; 56/14.9, 15.1, 15.2, 15.5, 228, 6, 7, 385

[56] References Cited

U.S. PATENT DOCUMENTS

| | | | |
|---|---|---|---|
| 2,527,343 | 10/1950 | Wilson | 280/456 A |
| 2,665,144 | 1/1954 | Birdwell | 280/462 |
| 3,635,494 | 1/1972 | Barkstrom | 280/462 |
| 3,757,500 | 9/1973 | Averitt | 56/14.9 |
| 3,791,673 | 2/1974 | Hornung | 172/311 |
| 3,827,724 | 8/1974 | Ackley | 280/511 |
| 3,832,834 | 9/1974 | Kovacs | 56/6 |
| 3,893,283 | 7/1975 | Dandl | 280/463 |
| 4,418,516 | 12/1983 | Donovan | 280/462 |

OTHER PUBLICATIONS

"Standard Handbook for Mechanical Engineers", Baumeister and Marks, Seventh Edition, pp. 8-52.

Primary Examiner—John J. Love
Assistant Examiner—Mitchell J. Hill
Attorney, Agent, or Firm—Cullen, Sloman, Cantor, Grauer, Scott & Rutherford

[57] ABSTRACT

An articulate tow bar for use with a ride-on for pulling an independent mower unit. The tow bar has first and second members pivotally attached at adjacent ends by a lockable coupling that permits the members to be positioned alternately in a transport position or working position. The first member is pivotally attached to the tractor by a horizontal hinge and the second member is pivotally attached to the independent unit by a universal joint, the pivotal connections permit the tractor and independent unit to operate on hilly uneven terrain. Controls are located on the articulate tow bar adjacent the mower for operating the independent unit which allows the tow bar and the mower unit to be readily adaptable to conventional mowers.

15 Claims, 5 Drawing Figures

TRAILING MOWER AND DRAWBAR ARTICULATION

BACKGROUND OF THE INVENTION

The following invention relates to an articulate tow bar for use in connecting a ride-on mower to an independent mower unit. More particularly, the present invention relates to a self contained independent mower unit operable from and connected to a ride-on mower by an articulate tow bar that has two positions, a first position that permits easy maneuverability, easy storage and a way to cut tall grass with only one pass and a second position that permits a large swath to be cut, approximately twice the normal swath of a conventional mower.

Conventional ride-on mowers having a centrally suspended mower assembly are normally limited to the swath that can be cut per pass by the width of the mower assembly. To increase the swath a larger mower assembly must be used which generally requires a larger ride-on mower because the mower assembly requires more horsepower to operate and the wheel base of the ride-on mower must be larger to permit central suspension. Replacing the ride-on mower and mower assembly is expensive and larger mower assemblies reduce maneuverability, create problems in storage and create problems in entering and exiting gateways, etc. Also, a single mower assembly generally cannot be used to cut tall grass in only one pass. Normally, at least two passes are required, one with the mower assembly raised to partially cut the grass to prevent the mower from bogging down and a second to cut the grass to an acceptable height.

The articulate tow bar and independent mower unit of the present invention provides a simple assembly for overcoming the above disadvantages while providing the advantage of cutting larger swaths per pass and cutting very tall grass in a single pass.

BRIEF SUMMARY OF THE INVENTION

The articulate tow bar of the present invention interconnects a ride-on mower having a suspended mower unit that is operated by a first power means to an independent mower unit having a second suspended mower unit operated by a second power means. The articulate tow bar has first and second elongated boom members having first and second ends that are pivotally attached at their adjacent first ends by a pivotal coupling means. The opposite second end of the first boom member is pivotally connected to the ride-on mower and the opposite second end of the second boom member is pivotally connected to the independent mower unit.

The booms can be rotated about the pivotal coupling means to a first position wherein the unit can be pulled directly behind the mower along substantially the same path as the mower or to a second position wherein the unit is pulled to the side of the mower permitting a swath to be cut that has a width that is substantially equal to the combined widths of the suspended mower units.

The coupling has a vertical pin which pivotally attaches the adjacent first ends and a horizontal plate which extends outwardly from the vertical pin. The plate is fixedly attached to the second boom, slidably supported on the surface of the first boom and has two radially spaced openings which correspond to the first and second positions. Each opening can be rotated over a third opening in the first boom to receive a locking pin that locks the booms in either the first or second positions respectively.

In the disclosed embodiment, the plate is pie-shaped having two linear sides extending outwardly at right angles to the pivot pin and a third curved side radially spaced from the pivot pin. The linear sides have flanges that extend downwardly from the plate to contact the sides of the first boom when rotation of the booms is completed to aid in aligning the first or second openings over the opening in the first member.

The pivotal connection of the second end of the first boom to the mower is by a horizontal hinge which permits the first boom to pivot about a horizontal axis. The horizontal hinge is made up of a yoke which is attached to the first boom having at least one clevis that can be aligned with a horizontal bore in a support arm attached to the mower. The clevis and support are fastened by a horizontal pin.

The pivotal connection of the second end of the second boom to the independent unit is by a universal joint. The universal joint includes a ball extending upwardly from the unit and a socket extending downwardly from the bottom of the second boom that envelopes the ball and permits universal movement of the second boom with respect to the unit.

The hinge and universal joint cooperate so that the independent mower unit can follow uneven terrain independently of the mower.

A control means is fixedly attached to the first boom adjacent the ride-on mower for controlling the second power means and suspended assembly of the mower unit from the ride-on mower. Control lines extend from the ride-on mower through the first and second booms to the mower unit interconnecting the ride-on mower, mower unit and control means.

An unlocking lever is mounted on the first boom adjacent to the mower to raise the locking pin and release the plate so that the booms may be rotated between the first and second positions. The lever can be operated from the mower seat and is mounted on a fulcrum for easy operation.

It is apparent from the above summary that the independent mower unit and articulated drawbar of the present invention form a substantially self contained unit that is easily attachable to a conventional ride-on mower to provide the advantages and overcome the disadvantages of conventional mowers.

Other advantages and meritorious features of the articulate tow bar of the present invention will be more fully understood from the following description of the preferred embodiment, the appended claims and the drawings, a brief description of which follows.

DESCRIPTION OF THE PREFERRED EMBODIMENTS

Figure 1:
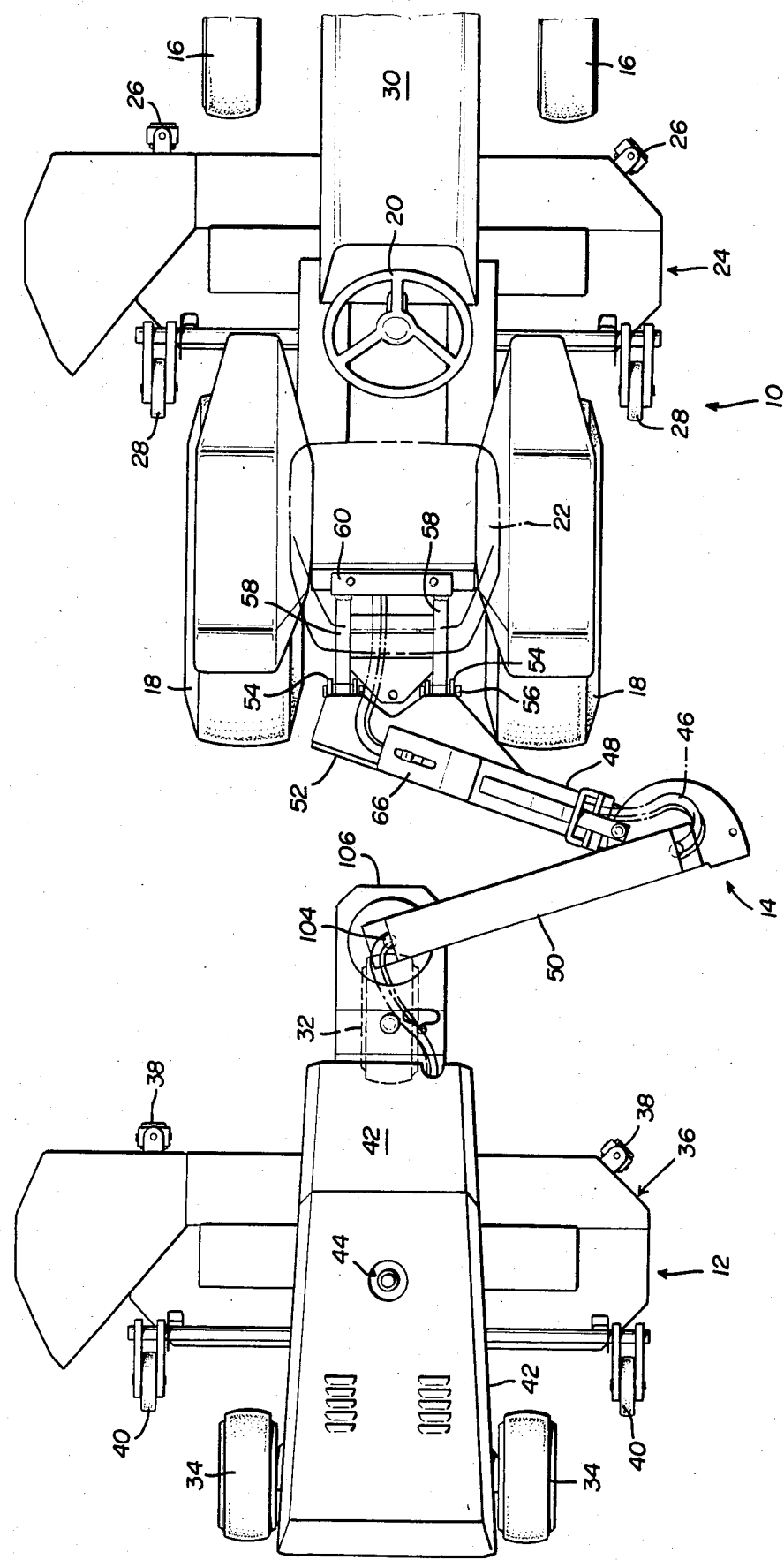
FIG. 1 is a top elevation of the articulate tow bar in the first position interconnecting a ride-on mower and an independent mower assembly.
Figure 2:
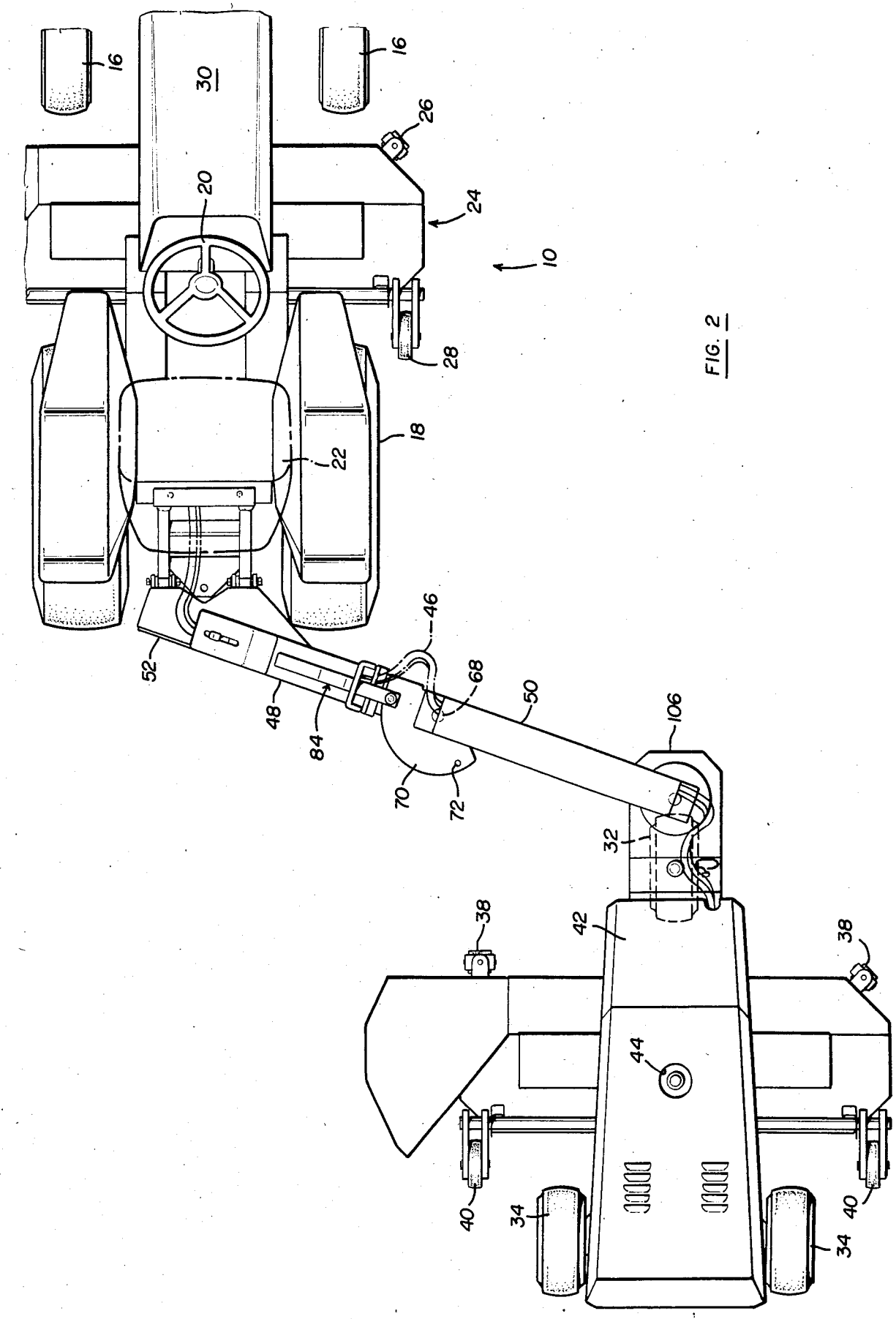
FIG. 2 is a top elevation of the articulate tow bar of FIG. 1 in the second position.

Referring to FIG. 1, a ride-on mower is illustrated generally at 10 interconnected to an independent mower unit 12 by an articulate tow bar 14. The tractor 10 has front wheels 16 controlled by a steering assembly 20 and rear wheels 18. A lawn mower assembly 24 is suspended between the front and rear wheels 16 and 18 by a linkage system 25 which permits assembly 24 to be lowered to a use position or raised to a non-use position, as for example by a hydraulic cylinder.

Assembly 24 is supported on the ground by front caster wheels 26 and rear gauge wheels 28. The rear gauge wheels are connected to assembly 24 by a linkage system 31 which adjusts assembly 24 for cutting height and to compensate for changes in the terrain. Assembly 24 has a mower blade 27 which is operated by a power take-off that is connected to a first power source located on the mower (not shown) and to the pulley and belt system 29.

Independent mower unit 12 is supported by a front castor wheel or wheels 32 and rear support wheels 34. In the preferred embodiment, the wheels 32 and 34 are in a tricycle arrangement with castor wheel 32 pivotally attached to the forward end of unit 12 permitting easy maunverability in response to mower 10. Unit 12 has a mower assembly 36 supported centrally between the front and rear wheels 32 and 34 and is supported on the ground by casters 38 and gauge wheels 40. A linkage system 39 allows assembly 36 to be raised and lowered as for example by a hydraulic cylinder to use and non-use positions and linkage system 41 permits assembly 36 to be automatically adjusted for cutting heigh and to correspond to terrain changes. Blade 35 of assembly 36 is operated by a pulley and belt system 37 connected to a power take-off (not shown) that is connected to a second power source independent of the the first power source. The power source is enclosed within cowling 42 and provides the added horsepower needed to operate blades 35 and allows unit 12 to be used with standard sized ride-on mowers.

Control lines 46 connect unit 12 to mower 10. A control panel 66 supported on a first tubular boom 48 permits operation of unit 12 from the drivers seat 22 without requiring the driver to leave his seat. The location of panel 66 also permits unit 12 to be used with any mower 10 having a hitching means, similar to the one to be described in more detail below. Thus, unit 12 is easily attachable and substantially self contained allowing almost universal application of the unit to conventional ride-on mowers.

Articulate tow bar 14 has a first boom member 48 which is pivotally attached to a second boom member 50. First boom 48 has a yoke 52 fixedly attached thereon with attaching ears 54 extending outwardly away from boom 48 in the direction of mower 10. The ears 54 can be aligned with horizontal bores in triangular supports 58 which are fixedly attached to the rear of mower 10 by a support bracket 60. Support bracket 60 is attached to the tractor chassis 64 by bolts 62 or similar means. When attached, boom 48 is angled with respect to mower 10 to allow wheel clearance and to provide the proper angle for positioning unit 14. Lateral pins 56 connect the ears 54 to the supports 58 and permit horizontal pivotal movement of boom 48 with respect to mower 10. Support 60 is easily adaptable to conventional mowers not equipped with a similar bracket, all that is required is for bracket 60 to be bolted to the conventional mower chassis.

Figure 5:
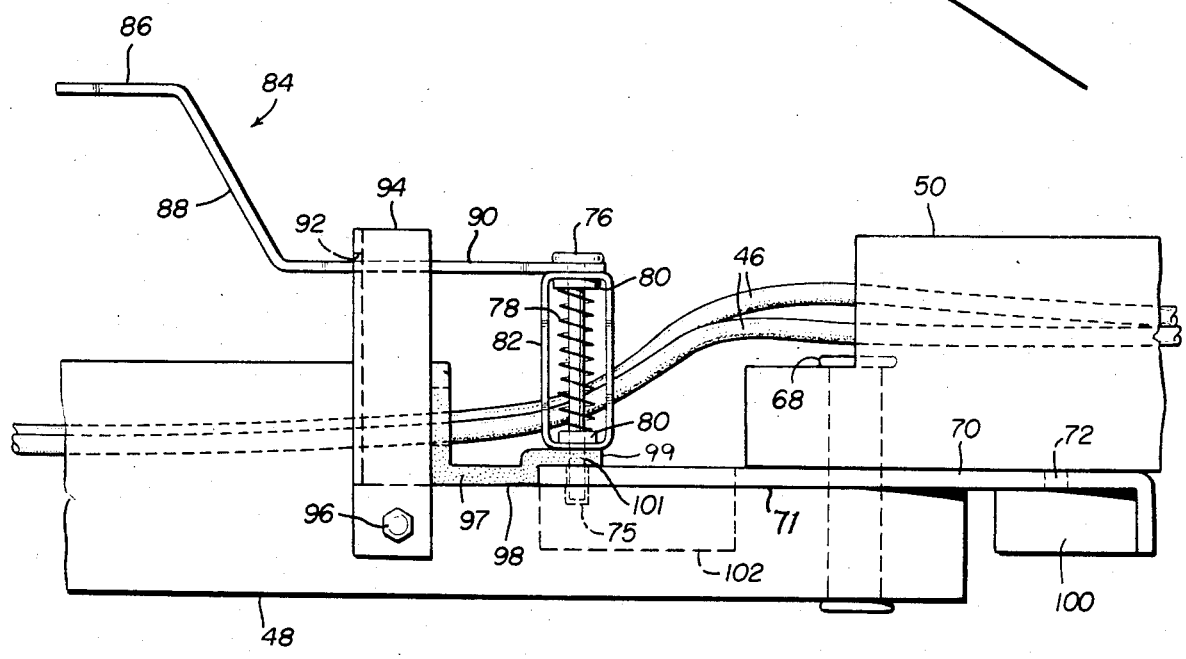
FIG. 5 is a partial side view of the articulate tow bar of FIG. 4.

The opposite end of boom 48 is attached to the adjacent end of boom 50 by a pivot pin 68, see FIG. 5. In the disclosed embodiment, a pie-shaped articulation plate 70 is fixedly attached to the bottom of boom 50 and is slidably supported upon a notched out surface 71 of the adjacent end of boom 48. Pivot pin 68 extends through plate 70 at approximately the apex of the pie-shaped plate 70.

Plate 70 has a first hole 72 corresponding to the first position and a second hole 74 corresponding to the second position, both holes 72 and 74 being radially spaced from the pin 68 adjacent the plates outer edge. A third hole 75 is formed in the surface of boom 48 and aligns with one of the holes 72 or 74 depending upon the position of booms 48 and 50. In the first position hole 72 is in alignment with hole 75 and in the second position hole 74 is in alignment with hole 75.

A locking pin 76 is received by the aligned holes to lock the booms 48 and 50 in their respective positions. A spring 78 retained around pin 76 and within bushings 80 and supported within a channel 82 biases locking pin 76 into the locking position.

Figure 4:
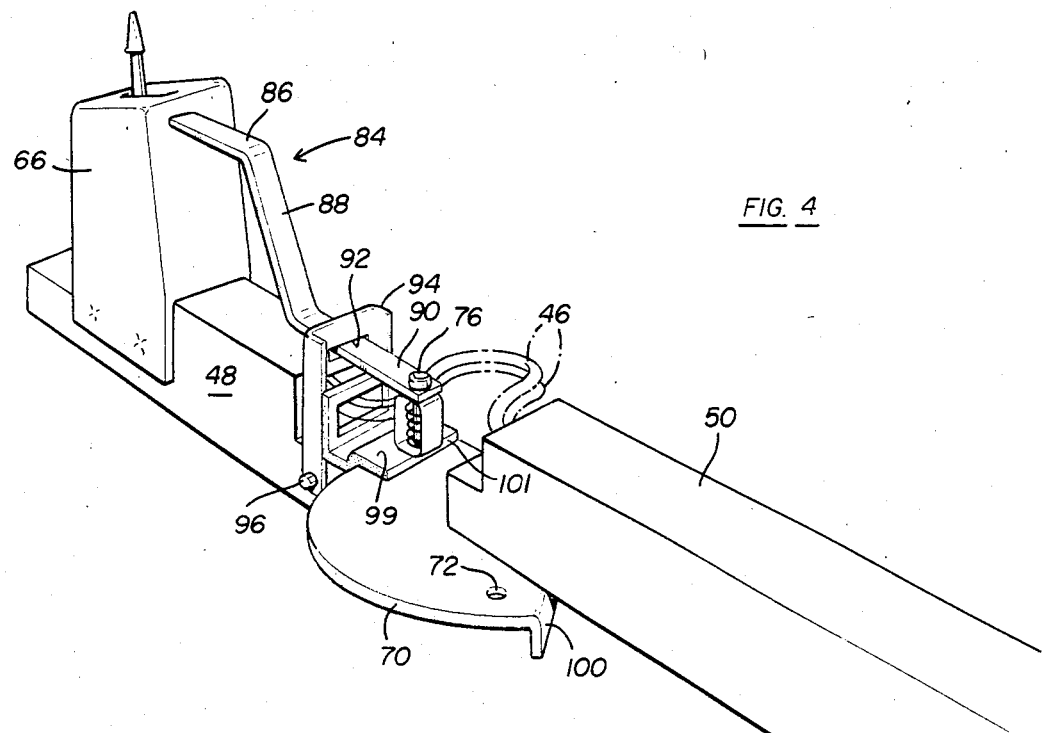
FIG. 4 is a partial perspective view of the articulate tow bar in the second position.

Locking pin 76, as shown in FIG. 4, is controlled by a lever 84 having a handle 86, a mid-portion 88 and an end section 90. The mid-portion 88 is angled upwardly with respect to end section 90 in the direction of mower 10 to permit handle 86 to be operated from the driver seat 22. End section 90 is received within a slotted opening 92 in a mounting bracket 94 which has a fulcrum so that locking pin 76 is easier to release. Mounting bracket 94 is supported in position by bolts 96.

Guide member 98 is provided to aid in positioning pin 76. Member 98 has a first section 97 attached to surface 71 by conventional means and a second stepped section 99 that overlaps plate 71 so that plate 71 rotates under section 99. An opening 101 is formed in section 99 for receipt of pin 76.

To aid in positioning the first and second holes 72, 74 over the third hole 75, plate 70 has downwardly extending flanges 100 and 102 which contact the side of boom 48 when booms 48 and 50 have been completely rotated to either the first or second positions.

Figure 3:
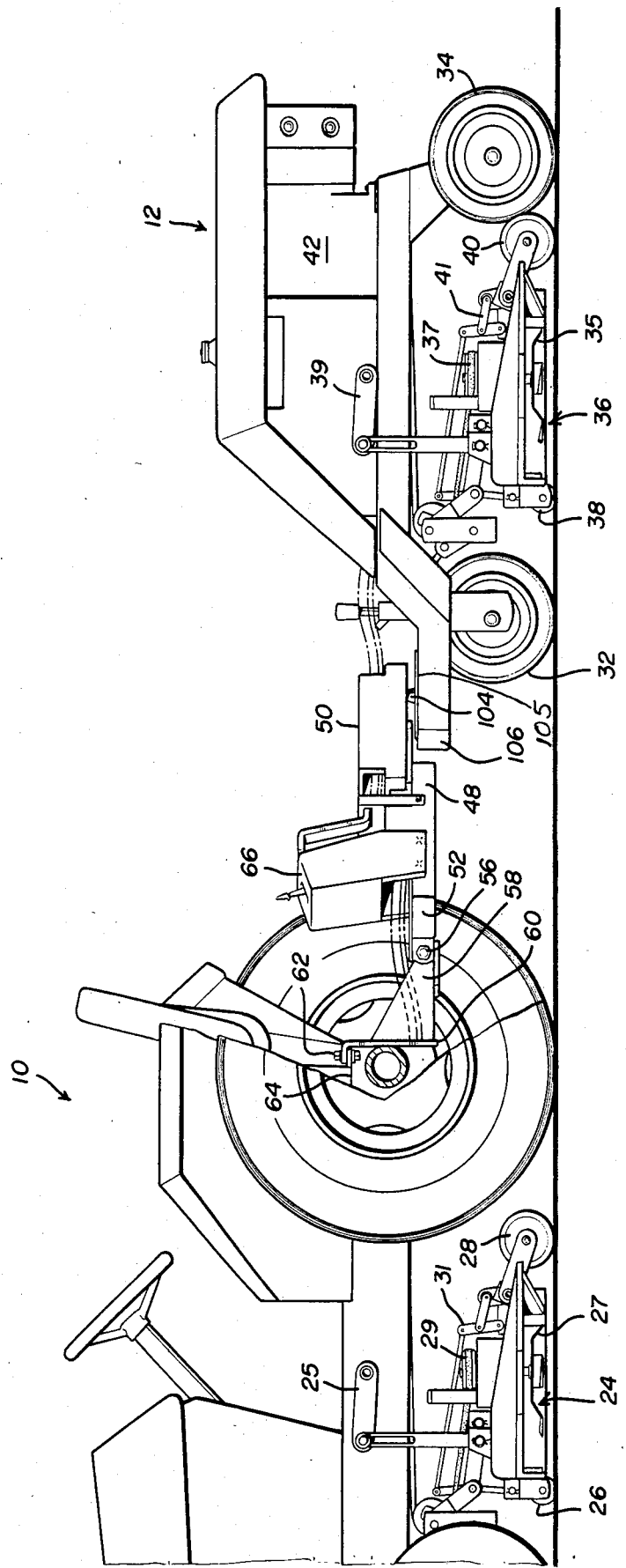
FIG. 3 is a side elevation of the articulate tow bar interconnecting the ride-on mower and independent mower unit.

With reference to FIG. 3, the opposite end of link 50 is attached to independent unit 12 by a universal joint comprised of a ball extending from a mounting plate 105, and a socket located in the bottom surface of boom 50, see 104. The ball and plate are fixedly attached to tongue 106 of unit 12.

In operation, unit 12 can be quickly attached to mower 10 by aligning attaching ears 54 with the bores in supports 58 and inserting the lateral pins 56. Cables 46 are then connected to hydraulic connectors (not shown) on mower 10.

With the articulate tow bar 14 and unit 12 in the first position, the unit 12 may be pulled from a storage facility without problem because the unit 12 and mower 10 are the same width. If tall grass is to be mowed, articulate to bar 14 is kept in the first position and assembly 24 is adjusted upwardly by linkage system 25 or linkage system 31 to a height that will allow partial cutting of the grass and assembly 36 is positioned by linkage system 39 or linkage system 41 to cut the grass to the preferred height, thereby allowing very tall grass to be cut in one pass.

If a wide swath of grass is to be cut in a single pass, as for example on a golf course or large estate, handle 86 on lever 84 is depressed by the operator from his seat 22. This raises end section 90 of the lever which releases locking pin 76 freeing plate 70 allowing boom 50 to rotate with respect to boom 48. By simply pulling mower 10 forward tow bar 14 can be rotated to the second position which allows substantially twice as wide a cut to be made in a single pass. The mower assembly 36 is completely controlled from control panel 66. The horizontal connection of boom 48 and the universal connection of boom 50 allow the unit to easily follow hilly terrain.

To transport the unit 12 and tractor. 10 back to storage the above process is reversed. Castor wheel or wheels 32 pivots to allow boom 50 to rotate with respect to unit 12.

It will be apparent to those skilled in the art that the foregoing disclosure is explanatory in nature rather than limiting, the invention being limited only by the appended claims.

What is claimed is:

1. An articulate tow bar for use with a tractor in pulling an independent unit, said articulate tow bar comprising:
   first and second members having first and second ends pivotally attached at adjacent first ends by a pivotal coupling means, the opposite second end of said first memeber being pivotally connected to said tractor, the opposite second end of said second member being pivotally connected to said unit,
   said first and second members being positionable about said coupling means to a first position wherein said unit is pulled along substantially the same path as said tractor and to a second position wherein said unit is pulled to the side of said tractor,
   said coupling means including a vertical pivot pin attaching said adjacent first ends and a locking means for locking said member in said first and second positions,
   said locking means comprising a horizontal plate extending outwardly from said pivot pin fixedly attached to said second member and slidably supported by said first member,
   said plate having two radially spaced openings corresponding to said first and second positions respectively, rotatably positionable over an aperture in said first member and a locking pin selectively receivable by one of said radially spaced openings and said aperture to lock said members in said first and second positions respectively.

2. The articulate tow bar of claim 1, wherein said plate is generally pie-shaped having two linear sides extending outwardly and at approximately right angles to said pin and a third curved side radially spaced from said pin connecting said linear sides,
   said linear sides extending downwardly to form flanges whereby said flanges selectively contact said first member to selectively align either of said first and second openings over said aperture.

3. The articulate tow bar of claim 1, further comprising a lever mounted on a fulcrum to raise said locking pin and release said plate whereby said second member may be rotated between said first and second positions, said lever being operable from said tractor.

4. The articulate tow bar of claim 1, wherein said pivotal connection of said second end of said first member to said tractor comprises a horizontal hinge about which said first member may pivot about a horizontal axis coaxial with the centerline of said horizontally positioned hinge.

5. The articulate tow bar of claim 4, wherein said horizontal hinge comprises a yoke fixedly attached to said first member having at least one clevis extending forwardly in alignment with at least one support having a horizontal bore therethrough, said clevis and support receiving a horizontal pin such that said first member may freely pivot about said horizontal axis.

6. The articulate tow bar of claim 1, wherein said pivotal connection of said second end of said second member to said unit comprises a universal joint.

7. The articulate tow bar of claim 6, wherein said universal comprises a ball and socket connection, said ball extending vertically upwardly from said unit, said socket opening downwardly from said second member enveloping said ball.

8. A mower device having an articulate tow bar interconnecting a ride-on mower having a suspended mower assembly operated by a first power means and an independent mower unit having a second vertically positional suspended mower assembly operated by a second power means, said articulate tow bar comprising:
   first and second elongated boom members pivotally attached at adjacent ends by a pivotal coupling means selectively lockable in a first position wherein said boom members are angularly disposed and said unit is pulled along substantially the same path as said ride-on mower and a second position wherein said boom members are generally axially aligned and said unit is pulled to the side of said ride-on mower,
   the opposite end of said first boom member being hingedly connected to said ride-on mower such that said first boom member pivots about a horizontal axis, the opposite end of said second boom member being pivotally connected to said independent mower unit by a universal joint whereby said second member universally pivots with respect to said unit,
   a control means fixedly attached to said first boom member adjacent said ride-on mower for controlling said second power means and the vertical position of said second suspended assembly from said ride-on mower,
   flexible control lines extending from said ride-on mower through said first and second boom members and said coupling means to interconnect said ride-on mower, mower unit and control means,
   an unlocking means operable from said ride-on mower attached to said first boom member adjacent said ride-on mower for selectively unlocking said coupling means to rotate said links to said first or second positions,
   said unit and articulated drawbar being substantially self-contained and readily attachable to conventional ride-on mowers.

9. The articulate tow bar of claim 8, wherein said pivotal connection of said first member to said tractor comprises a horizontal hinge about which said first member may pivot about a horizontal axis coaxial with the centerline of said horizontally positioned hinge.

10. The articulate tow bar of claim 9, wherein said horizontal hinge comprises a yoke fixedly attached to said first member having at least one clevis extending forwardly in alignment with at least one support having a horizontal bore therethrough, said clevis and support receiving a horizontal pin such that said first member may freely pivot about said horizontal axis.

11. The articulate tow bar of claim 8, wherein said pivotal connection of said second member to said unit comprises a universal joint.

12. The articulate tow bar of claim 11, wherein said universal joint comprises a ball and socket connection, said ball extending vertically upwardly from said unit, said socket opening downwardly from said second member enveloping said ball.

13. An articulate tow bar for use with a tractor having a first suspended mower assembly for pulling an independent second mower assembly, said articulate tow bar comprising:
   first and second members having first and second ends pivotally attached at adjacent first ends by a pivotal coupling means lockable in a first position wherein said unit is pulled along substantially the same path as said tractor and in a second position wherein said unit is pulled to the side of said tractor,
   the second end of said first member being hingedly connected to said tractor such that said first member pivots about a horizontal axis,
   the second end of said second member being pivotally connected to said unit by a univeral joint comprising a ball and socket connection, said ball extending vertically upwardly from said unit, said socket opening downwardly from said second member enveloping said ball, whereby said second member universally pivots with respect to said unit,
   said connections cooperating to permit said mower to follow uneven terrain independently of said first mower.

14. The articulate tow bar of claim 13, wherein said pivotal connection of said second end of said first member to said tractor comprises a horizontal hinge about which said first member may pivot about a horizontal axis coaxial with the centerline of said horizontally positioned hinge.

15. The articulate tow bar of claim 14, wherein said horizontal hinge comprises a yoke fixedly attached to said first member having at least one clevis extending forwardly in alignment with at least one support having a horizontal bore therethrough, said clevis and support receiving a horizontal pin such that said first member may freely pivot about said horizontal axis.

* * * * *